3,028,417
PROCESS OF MAKING HYDROXY ESTER COMPOUNDS

John L. Eisenmann, Braintree, Mass., assignor, by mesne assignments, to Diamond Alkali Company, Cleveland, Ohio, a corporation of Delaware
No Drawing. Filed Jan. 19, 1960, Ser. No. 3,259
4 Claims. (Cl. 260—484)

This invention relates to the synthesis of organic oxygen-containing compounds and, in particular, to the synthesis of β-hydroxy derivatives of carboxylic acids. More particularly, the invention relates to the synthesis of alkyl β-hydroxybutyrates by means of employing a metal carbonyl catalyst for the reaction between propylene oxide, carbon monoxide, and compounds capable of adding hydrogen onto the oxygen of epoxy compounds, such as alcohols, amines, and mercaptans.

The principal object of the present invention is to provide an improved and commercially economical process for making alkyl β-hydroxybutyrates, a class of compounds which can be dehydrated to alkyl crotonates which, in turn, are highly valuable chemicals with considerable utility in the plastics industry as reactive monomers and also dehydrogenatable to acetoacetates, etc.

Another object of the invention is to provide an improved and economical process for the preparation of various β-hydroxy esters, thiolesters, and amides of carboxylic acids for use as chemical intermediates, as for example, in the synthesis of perfumes, food colors and flavors, pharmaceuticals, and as reactive monomers in the preparation of plastics when dehydrated to the corresponding unsaturated esters. Other objects will appear hereinafter.

Heretofore, β-hydroxy esters of carboxylic acids have commonly been synthesized by means of the Reformatsky reaction, a method involving an interaction between a carbonyl compound, an α-halo ester and zinc in the presence of ether or ether-benzene, followed by hydrolysis. This method has not been conveniently adaptable to commercial large-scale processes and is furthermore limited in its scope with reference to the variety of compounds that can be realized from it.

It was previously proposed (U.S. Pat. No. 2,782,226) that ethylene oxide, an alcohol, and water be reacted in the presence of carbon monoxide and dicobalt octacarbonyl catalyst at pressures between 100 to 200 atmospheres and at a temperature of about 60 to 100° C. to produce specifically hydracrylic esters. Furthermore, the process involving the reaction of ethylene oxide, carbon monoxide, water and an alcohol is not of the type wherein the product obtained is one of a series of isomers capable of being produced by the reaction but of the type wherein the product produced is the sole member of its species. In the present case, conditions attending the reaction can be controlled so that various products (isomers) can be produced simultaneously or one can be produced to the virtual exclusion of the others. This procedure is unexpectedly specific and the presence of water was found necessary, probably due to the extremely explosive character and volatility of the ethylene oxide component of the reaction mixture.

There is no known record in the prior art of any process having been proposed which possesses the adaptability toward the production of β-hydroxy esters of carboxylic acids having four or more carbon atoms from the reaction with an epoxy compound containing three or more carbon atoms with carbon monoxide and methanol under anhydrous conditions. Other similar methods for preparing β-hydroxy compounds have also been characterized by insufficient yields or by an incapacity for adaptability toward large-scale production.

It has been found, in accordance with the present invention, that propylene oxide can be converted into alkyl β-hydroxybutyrate by reacting the same at a pressure of 800 to 6,000 lbs. per square inch and at a temperature of 80° C. to 300° C., with carbon monoxide, an alcohol, and a metal carbonyl catalyst under anhydrous conditions. Moreover, by manipulating the conditions of temperature and pressure, this process has been discovered to have applicability toward the synthesis of a wide variety of β-hydroxy compounds, especially the higher analogs of the alkyl β-hydroxybutyrates, e.g., the alkyl β-hydroxy nonylates. By using appropriate conditions, an epoxy compound can be reacted with a mercaptan to yield a β-hydroxy thiolester. Similarly, an epoxy compound can be reacted with an amine to yield a β-hydroxyamide. All the processes of this invention are suitable for large-scale production and tend to produce economically adequate yields of the desired products. The products, in general, are highly valuable in the preparation of plastics when dehydrated to corresponding unsaturated compounds.

The mechanism of the reactions involved is illustrated by the following fundamental equations:

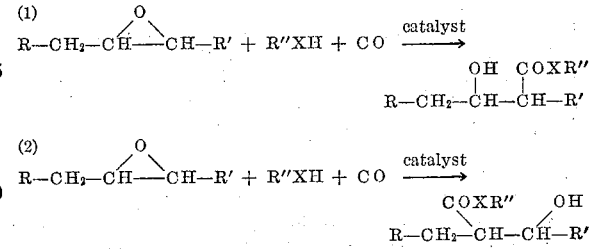

where X represents O, S, or NR''' and where R, R', R'', and R''' are either hydrogen or organic radicals which may permissibly contain further epoxy linkages but which are generally simple aliphatic or aromatic groups. If an R contains olefinic or acetylenic unsaturation, the condensation of the carbon monoxide will occur to some extent upon the unsaturated bond. Both Reactions 1 and 2 will ordinarily occur concurrently, that product being produced in the highest yield which is associated with the reaction being most favored by the conditions of temperature and pressure used.

As illustrated by the above equations, the reaction can be regarded as proceeding by means of the addition of the hydrogen of the R''XH onto the oxygen of the epoxy compound while the remaining portion, i.e, the R''X—, together with the carbon monoxide, adds to one of the carbon atoms of the epoxy linkage, the conditions of temperature and pressure used influencing the selection of the particular carbon atom.

Although the reactants combine in the ratios given in the above equations, it is generally desirable that one or more of the reactants occur in excess in order to accelerate the progress of the reaction. For example, in Equation 1 or 2, although the carbon monoxide and R''XH combine in equimolar amounts, an excess of either can be employed up to ratios of about 4:1 for the R''XH compound or up to about 20:1 for the carbon monoxide. Higher ratios would neither substantially enhance the rate of reactivity of the reactants nor be economical as a commercial process.

The epoxy compounds employed as the starting material for the reactions within the processes of this invention are commonly of the type wherein R and R' are monovalent, aliphatic, or simple benzyl hydrocarbon radicals free of non-benzenoid unsaturation or wherein either R or R' is hydrogen. Compounds of this type are illustrated by the following: 1,2-epoxypropane, 3,4-epoxyhexane, 1,2-epoxy-1-phenylethane. Other more complicated epoxy compounds can be employed in this reaction, those containing functional groups or olefinic unsaturation, although, in general, the yields tend to be smaller as the epoxy containing material becomes more complicated. Illustrative compounds are: -napthyl ethylene oxides, 2,3-epoxy-1-propanol, 2,3-epoxy-1-methoxypropane, 1-diethylamino-2,3-epoxypropane, 2,3-epoxy-butanoic acid and epoxycyclohexane.

The carbon monoxide used in the processes of this reaction should be free of gases which might enter into conflicting reactions involving their condensation with carbon monoxide onto the epoxy compound. Such deleterious gases include hydrogen, hydrogen sulfide, and ammonia, etc., although a certain amount of hydrogen may be present.

Compounds generally employed in the processes of this invention as hydrogen donators (easily replaceably hydrogen) include alcohols, mercaptans, and amines. Alcohols used in the synthesis of the alkyl β-hydroxybutyrates are typically methanol, ethanol, and higher aliphatic alcohols; however, the use of aryl alcohols such as benzyl alcohol to prepare aryl β-hydroxybutyrates is also effective for this purpose. Mercaptans and amines are preferably kept to the simpler types.

Soluble metal carbonyls must be present as catalysts for the reaction, the hydroxy ester synthesis constituting the processes of this invention being homogeneous phase reactions. Catalysts which may be used are carbonyls of cobalt, rhodium and iridium. The catalytic effect of dicobalt octacarbonyl is, in general, the most effective of the group and is the preferred catalyst for most reactions in the processes of this invention and is at least an adequate catalyst for all of them. It is prepared by reacting anhydrous cobalt carbonate with a 1:1 carbon monoxide-hydrogen mixture using an inert, water-free solvent and pressurizing the system to about 5,000 lbs. per square inch at a temperature of about 160° C. The reaction requires approximately two hours. This compound is recovered in the form of orange-red crystals and is readily soluble in organic solvents. It should be stored under refrigeration as a solution in an inert solvent, such as petroleum ether.

The influence of an efficient metal carbonyl catalyst is so profound that in reactions catalyzed by a particular carbonyl compound, even minute concentrations of the catalyst are sufficient for satisfactory yields of a desired product. Hence, concentrations as low as 0.001 mole percent of dicobalt octacarbonyl based on the weight of epoxy compound have been found to function catalytically very well. Concentrations of the carbonyl catalyst will ordinarily not be conducive to greater efficacy above about 10 mole percent of the weight of the epoxy compound. The preferred and convenient range was found to be from about 0.4 to about 4.0 mole percent.

Another factor to be taken into consideration is the stability of the particular carbonyl catalyst employed which ordinarily will decrease rapidly with an increase in temperature. The stability will be dependent upon the combined effect of temperature and pressure, the higher the temperature used, the higher the pressure required to keep the carbonyls from decomposing; for example, dicobalt octacarbonyl requires a pressure of about 600 lbs. per square inch if a temperature of 150° is maintained. Accordingly, the preferred conditions for the reaction of an epoxy compound with carbon monoxide and a hydrogen contributing compound with a metal carbonyl catalyst have been found to consist of pressures between 800 and 5,000 lbs. per square inch and temperatures between 80° C. and 300° C. Generally, the higher pressures tend to produce the higher yields of hydroxyester products until a maximum is reached. A highly useful range applicable to many reactions involved in this invention is 2,500–4,000 lbs. per square inch, a range especially suited toward the synthesis of the alkyl β-hydroxybutyrates.

Care should be exercised that the temperature of the reaction not exceed the decomposition point of either the epoxy compound or the hydroxy products. If the catalyst employed for a particular reaction is unusually effective, good yields may be obtained at lower temperatures and pressures than would be the case were a less active catalyst used. The duration of the reaction is, of course, a vital factor in determination of eventual yields. In view of the range of components than can be used as starting materials, the intervals of time necessary to produce satisfactory yields will vary within wide limits, but generally a period of at least one hour is required for a reaction. Prolongation does not necessarily automatically increase yields, for when a fraction is continued for extended periods of time, the danger exists that, under the influence of an active catalyst and high pressures, the reaction products will condense either with themselves or with the epoxy compound, or that other secondary and undesirable reactions will occur.

Having recovered a β-hydroxy ester from one of the processes of this invention, this product can be converted into the corresponding unsaturated ester by means of dehydration using techniques commonly employed for this purpose, such as heating with sulfuric acid or phosphorus pentoxide. For example, an alkyl β-hydroxybutyrate can be dehydrated by sulfuric acid. Hydrolysis of these unsaturated esters yield the corresponding unsaturated acid, as, for example, an alkyl crotonate can be hydrolyzed to crotonic acid.

In the general preferred method of practicing this invention, an epoxy compound with at least three carbon atoms, an active hydrogen contributing compound or easily replaceably hydrogen and a solution of the metal carbonyl catalyst in an inert anhydrous solvent, such as petroleum ether, are placed in a pressure-resistant vessel, which is first flushed with nitrogen and then charged with carbon monoxide to the desired pressure. Agitation is applied preferably by rocking the reaction vessel, and the temperature of the mixture is brought rapidly to the level desired and maintained for a length of time sufficient to produce satisfactory yields of the desired product. Upon cooling, the reaction products are removed, the solvent distilled off, and the products separated by fractional distillation or extraction. The residue following distillation will contain the elemental metal of the carbonyl used as catalyst, said metal can then be recovered and rereacted with carbon monoxide to yield the metal carbonyl catalyst for subsequent reuse.

A familiar phenomenon in reactions involving carbon monoxide at high pressures, is the superior performance obtained from a reaction vessel "conditioned" by previous similar reactions. That is, such a vessel intensifies the catalytic effect of the catalyst employed.

The following examples, while limited to only a few of the reactions possible under the processes of this invention, are to be understood as not in any way limiting the scope of the invention.

*Example 1*

Into a high pressure tubular autoclave fixed on a rocking assembly was added 58 g. (1.0 mole) of 1,2-epoxy-propane, 243 ml. (6.0 moles) of methanol and 8.0 g. (0.023 mole) of dicobalt octacarbonyl dissolved in 100 cc. of petroleum ether, boiling point 80–100° C. The autoclave was then sealed, flushed first with nitrogen, then with carbon monoxide and finally charged with carbon monoxide to a pressure of 3,500 lbs. per square inch. Rocking was started and heat applied until a temperature of 130° C. was reached. The temperature was maintained at 130° C. for four hours. The autoclave was allowed to cool to room temperature and the reaction mixture removed. The petroleum ether and unreacted methanol were distilled off at atmospheric pressure. The higher boiling reaction products were fractionated under reduced pressure, the methyl β-hydroxybutyrate being distilled off at 48–50° C. with a pressure of 3–5 mm. The methyl β-hydroxybutyrate recovered analyzed to a purity of 96.6% and represented a yield of 58%.

Example 2

A reaction mixture composed of 1.0 mole of cyclohexene oxide, 1.0 mole of isobutylamine and 0.04 mole of dicobalt octacarbonyl dissolved in 300 cc. of petroleum ether, boiling point 80–100° C., was placed in a high pressure tubular autoclave fixed on a rocking assembly, sealed, flushed with nitrogen, then carbon monoxide, and finally charged with carbon monoxide to a pressure of 3,200 lbs. per square inch. Heat and rocking were applied and a temperature of 200° C. was maintained for 8 hours. After cooling, the reaction products were removed, the petroleum ether was distilled off and the residue extracted to yield N-isobutyl-O-hydroxyhexahydrobenzamide in a yield of 37% based on the starting material.

Example 3

A reaction mixture composed of 1.0 mole of 1,2-epoxy-2-methyl-octane, 4.5 moles of benzyl alcohol and 0.04 mole of rhodium octacarbonyl dissolve in 100 cc. of petroleum ether, boiling point 80–100° C., was placed in the autoclave and, using the previous technique, charged to a pressure of 4,600 lbs. per square inch with carbon monoxide and brought to a temperature of 120° C. which was maintained for 18 hours. After cooling, the solvent was removed, the reaction products were extracted with ether to yield a fraction identified as benzyl $\beta$-hydroxy-$\beta$-methyl nonylate. The fraction, analyzed for the ester, represented a yield of 40% based on the starting material.

Example 4

A reaction mixture composed of 1.0 mole of 1,2-epoxy-3-phenoxypropane, 1.0 mole of benzyl mercaptan and 0.04 mole of iridium carbonyl dissolved in 300 cc. of petroleum ether, was placed in the autoclave and, after flushing with nitrogen and carbon monoxide, charged to a pressure of 3,000 lbs. per square inch with carbon monoxide. A temperature of 250° C. was maintained for 6 hours. The reactor was then cooled, flushed, and the products removed. Work-up by distillation and extraction gave the benzyl thiol ester of $\beta$-hydroxy-$\gamma$-phenoxy butyric acid in 30% yield.

What is claimed is:

1. A process for preparing organic hydroxy compounds of the group consisting of esters, thiolesters, and amides, which comprises reacting, under substantially anhydrous conditions, carbon monoxide and an active hydrogen contributing compound selected from the group consisting of alcohols, amines and mercaptans, in the presence of a metal carbonyl catalyst of the group consisting of cobalt, rhodium, and iridium at a temperature in the range of about 80° C. to 300° C. and at a superatmospheric pressure in the range of about 800 to 6000 pounds per square inch, with an organic compound containing at least three carbon atoms having at least one epoxy linkage thereto and recovering the hydroxy compound from the reacted mass.

2. The process of claim 1, wherein the hydrogen contributing compound is an alcohol.

3. The process of claim 1, wherein the organic compound is propylene oxide.

4. The method of producing alkyl $\beta$-hydroxybutyrate comprising the steps of mixing propylene oxide and an aliphatic alcohol in the presence of dicobalt octacarbonyl under substantially anhydrous conditions in a closed container, charging said container with carbon monoxide until a pressure of about three to four thousand pounds per square inch of pressure is obtained therein, heating said container while agitating the same to a temperature of about 80 to 200° C. for a period in excess of one hour, cooling the mass, and distilling the alkyl $\beta$-hydroxy butyrate therefrom.

References Cited in the file of this patent
UNITED STATES PATENTS
2,782,226    Séon et al. _____ Feb. 19, 1957